United States Patent Office 2,799,467
Patented July 16, 1957

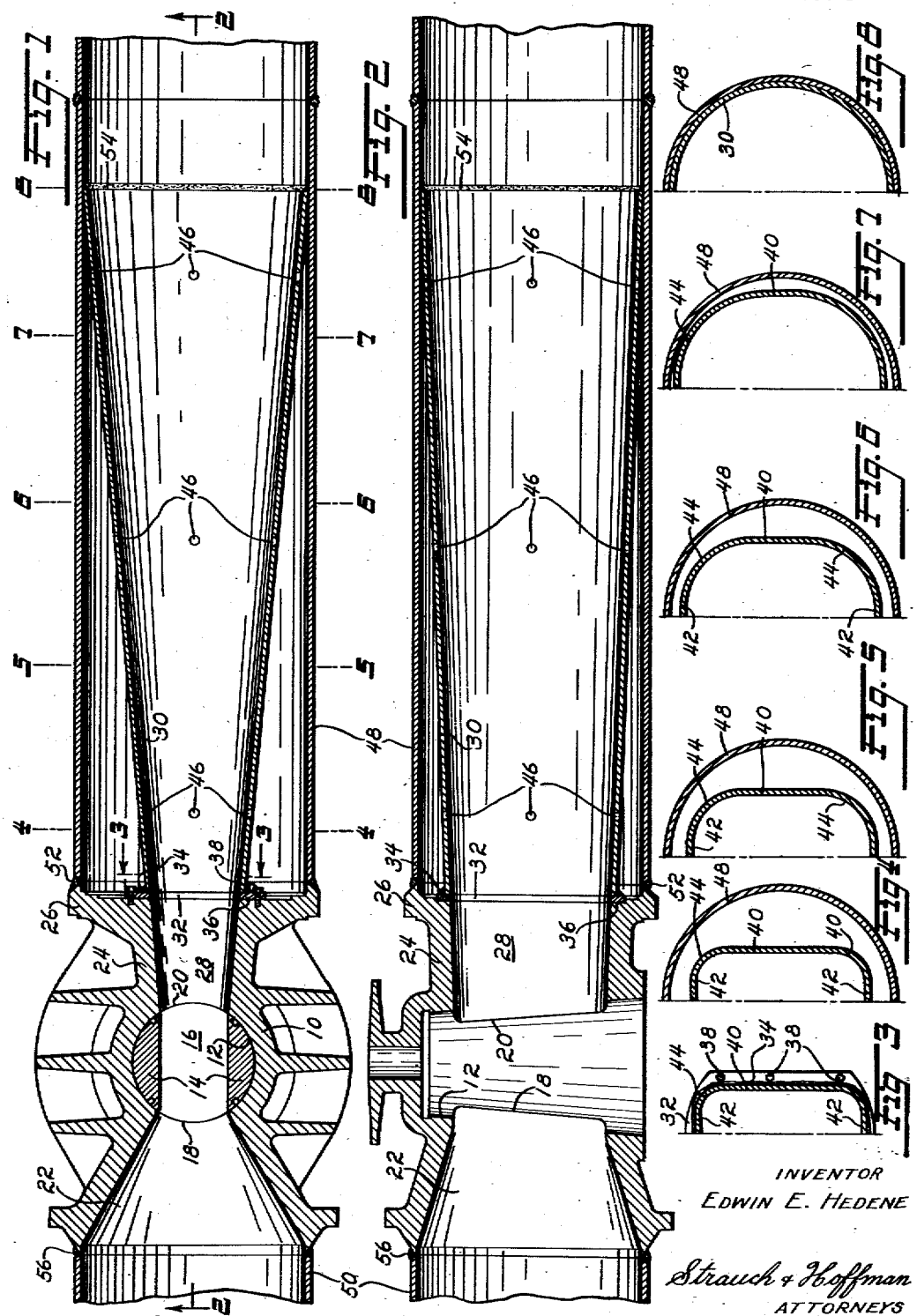

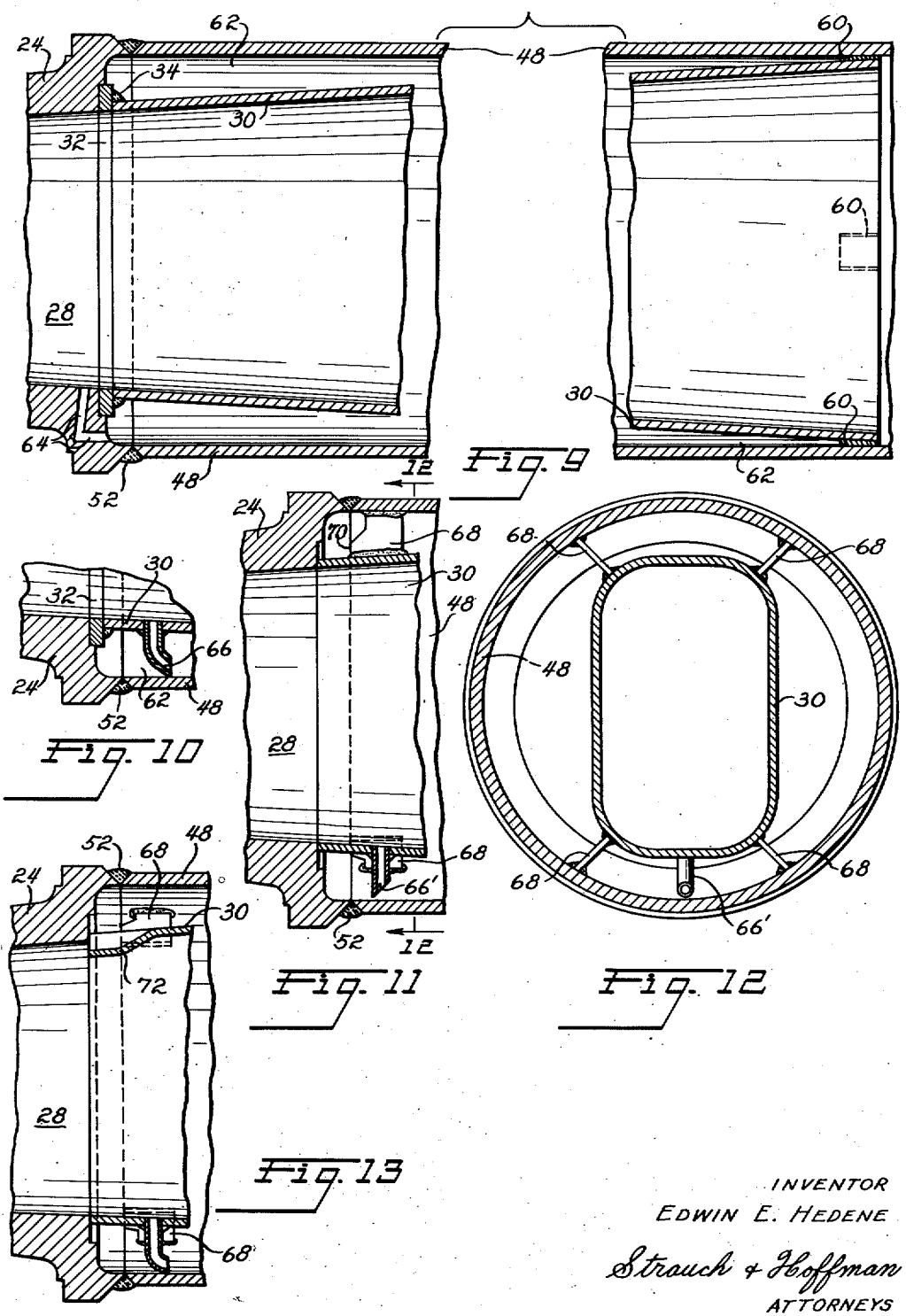

2,799,467

VENTURI VALVE

Edwin E. Hedene, Pittsburgh, Pa., assignor to Rockwell Manufacturing Company, Pittsburgh, Pa., a corporation of Pennsylvania Application January 18, 1949, Serial No. 71,450

9 Claims. (Cl. 251—124)

This invention relates to venturi valves for use in connection with conduits to create a pressure difference which bears a definite relation to the rate of fluid flow.

In recent years, pipe lines up to 30 inches in diameter have been used in the petroleum industry, and it has been found that venturi type valves as heretofore proposed cannot be employed in connection with such large capacity pipe lines without resulting in a more or less severe pressure drop at the down-stream side of the valve, which becomes more pronounced with increase in velocity.

It is therefore the general object and purpose of the present invention to provide a venturi valve adapted to be interposed between and rigidly connected with the adjacent pipe line sections and a pressure recovery tube so constructed and arranged relative to the pipe wall and the outlet port of the valve that the pressure drop at the down-stream side of the valve will be negligible.

It is another object of the invention to provide a venturi valve of the lubricated plug type and a relatively long flaring tube supported at its smaller end on the valve body in alignment with the vertically elongated outlet port thereof, and said tube progressively varying to circular form to its larger end, where it is welded to the wall of the pipe section. It has been found that a venturi tube of this construction when used with a plug type valve, results in a very rapid recovery of pressure.

It is an additional object of the invention to provide a pressure recovery tube for venturi valves having means for balancing fluid pressures internally and externally thereof so that a light weight relatively thin-walled tube may be employed.

A further object of the invention resides in the provision of simple and effective means for removing condensates collecting in the pipe line below the pressure recovery tube and discharging the same into the fluid stream.

It is also the object of the present invention to provide a venturi valve as above characterized which is of rugged and inexpensive construction, and can be easily and quickly installed in existing pipe lines.

With the above and other objects in view, the invention comprises the improved venturi valve and the construction and arrangement of its several parts, as will hereinafter be more fully described, illustrated in the accompanying drawings and subsequently incorporated in the sub-joined claims.

In the drawings, wherein I have disclosed one simple and practical embodiment of the invention and in which similar reference characters designate corresponding parts throughout the several views;

Figure 1 is a horizontal sectional view showing a lubricated plug type venturi valve embodying the present improvements and installed in the pipe line.

Figure 2 is a vertical longitudinal section taken substantially on the line 2—2 of Figure 1, the valve plug being omitted.

Figure 3 is a fragmentary transverse sectional view taken substantially on the line 3—3 of Figure 1;

Figures 4 to 8 inclusive are similar transverse sectional views taken substantially on the lines 4—4, 5—5, 6—6, 7—7, and 8—8 of Figure 1.

Figure 9 is a sectional view, similar to Figure 2, illustrating one form of eductor means through which condensates collecting in the pipe line below the pressure recovery tube are removed and discharged into the fluid stream flowing through said tube.

Figure 10 is a fragmentary sectional view showing an alternative embodiment, in which the eductor tube is carried by the pressure recovery tube.

Figure 11 is a sectional view similar to Figure 9, in which means is provided for supporting the pressure recovery tube at its ingress end within the pipe line section, independently of the venturi valve body.

Figure 12 is a transverse sectional view taken substantially on the line 12—12 of Figure 11; and Figure 13 is a fragmentary sectional view, similar to Figure 11, in which the wall of the pressure recovery tube at its ingress end is formed with means to admit velocity pressure from the fluid stream to the chamber between the recovery tube and the line pipe wall.

The selected illustrated embodiment of the invention comprises a valve of the lubricated plug type, such for instance as that shown in the Nordstrom Patent No. 2,398,444, and includes the valve body 10 having a vertically extending bore formed with the axially tapering seat 12 for the correspondingly tapered valve plug 14. In the present instance, this plug 14 is provided with an axially elongated passage 16 to register at its opposite ends with the similar vertically extending inlet and outlet ports 18 and 20 respectively formed in the valve body at diametrically opposite sides of the seat 12 when the plug 14 is in its open position as shown in Figure 1.

The valve body 10 at the up-stream side thereof is provided with a venturi-form inlet passage 22 leading to the port 18. The wall of the body 10 in which this passage is formed is cylindrical at its larger end for connection with one of the pipe line sections.

At the down-stream side of the valve the lateral extension 24 of the valve body is formed with an axially projecting external flange 26 and the outlet passage 28 leading from the substantially rectangular port 20 and of gradually flaring or increasing cross-sectional area. This passage, at the end face of the extension 24 is intermediate the contour of port 20 and a circular pipe section. The passages 22, 16 and 28 thus constitute a venturi throat to be interposed in a fluid pipe line or conduit as presently explained.

A longitudinally elongated, axially tapering tube 30 has a flange 32 securely welded to the smaller end thereof as at 34. This flange is seated in a recess 36 provided in the end face of the valve body extension 24 and is rigidly secured thereto by means of the bolts or screws 38. As seen in Figure 2 of the drawings, the inner edge faces of the flange 32 and the inner surfaces of the tube 30 are thus positioned in accurate alignment with the surfaces of the outlet passage 28. If desired the tube end, either with or without the flange 32, may be welded instead of bolted to the valve body. Also, as will be later described, the tube may be supported in the line pipe without positive connection to the valve body.

As seen in Figure 3 of the drawings, the smaller end of the tube 30 is of substantially the same cross-sectional form as the outlet end of passage 28, having vertically extending side portions 40 connected with the upper and lower horizontal portions 42 by the rounded or curved corner sections 44. From this point the vertical and transverse dimensions of the tube gradually increase with a progressively increasing radius of the curved wall sections 44 as shown in Figures 4 to 8, until at its larger end all parts of the tube wall are equidistant from the axial center line of the tube and it has a truly circular form of predetermined diameter as seen in Figure 8. At longitudinally spaced points along the wall of the tube 30 radial openings 46 are provided therein for a purpose which will be presently explained.

In Figures 1 and 2 of the drawings, I have shown the above described rotary plug type verturi valve assembly installed in a 30 inch pipe line between adjacent pipe sections 48 and 50. For a 24 inch valve, the pressure recovery tube 30 is approximately 8 feet in length. The down stream pipe line section 48 is telescoped over the pressure recovery tube 30 and one end of said pipe section then connected to the flange 26 on the valve body by the continuous annular weld 52. The tube 30 is then securely fixed at its larger end to the pipe wall by a similar annular weld 54. The pipe section 50 at the up-stream side of the valve is then rigidly joined to the valve body at the ingress end of passage 22 by the annular weld 56. Of course it will be understood that if desired in lieu of the welds 52 and 56, the valve body may be connected with the pipe line sections by means of suitable detachable couplings.

In operation, the tube 30, after passage of the fluid through the valve, functions in the manner well understood to reconvert velocity into pressure at the downstream side of the valve, and by reason of the above described construction and arrangement of the tube 30 in the pipe line section 48, ideal flow conditions are obtained and, notwithstanding large volume and high velocity, the pressure recovery will be very rapid, resulting in practically zero pressure drop in the down-stream pipe section 48. It will be noted that the provision of the openings 46 in the wall of the tube results in a balance of internal and external fluid pressures to thus obviate possible distortion of the tube wall, and permitting of the use of a relatively light weight thin-walled tube.

Referring now to Figure 9 of the drawings, if desired instead of the pressure balancing openings 46 and the weld 54 between the egress end of tube 30 and the pipe wall, I may provide this end of the tube with a number of circumferentially spaced external projections as indicated at 60 to slightly space the tube wall radially from the pipe wall and form a number of connecting passages between the chamber 62 externally of tube 30 and the interior of the pipe line, beyond the egress end of said tube. Thus the line pressure existing at this end of the pressure recovery tube will substantially equalize the pressures interiorly and exteriorly of the tube wall.

In the use of a venturi pressure recovery tube within the conduit pipe section, condensates may collect in the bottom of the pipe below the pressure recovery tube, tending to internally corrode the pipe wall which is normally subjected to the line pressure, and thus result in failure. Therefore, I preferably provide an eductor means for the purpose of removing such condensates and discharging the same into the fluid stream flowing through the pressure recovery tube. In Figure 9, wherein the recovery tube is bolted to the valve body, as shown in Figure 1, the wall of said valve body at its lower side is formed with a duct or passage 64 communicating at its lower end with the chamber 62 and opening at its upper end into the down-stream section 28 of the venturi throat, adjacent to the ingress end of the recovery tube 30. However, as an equivalent of this passage, I may use the eductor tube 66, shown in Figure 10 of the drawings, having one end thereof secured to the wall of the recovery tube adjacent the mounting flange 32 to extend downwardly therefrom in the chamber 62 and having its other open end preferably curved in the downstream direction, and adjacent the outer periphery of chamber 62.

With a fluid such as gas flowing through the venturi throat, a static pressure loss is created at the ingress end of the tube 30, a part of which is recovered at the discharge or egress end of said tube. Although the flow of gas past the openings at the egress end of the tube 30 might theoretically create an aspirating effect, such effect will be small relative to or even eliminated because of the differential pressure rise in the gas from the inlet to discharge end of tube 30 and the pressure within the chamber 62 therefore will be substantially equal to the pressure at the discharge end of the tube 30. Therefore, should condensates deposit in the chamber 62 below the tube, the pressure differential existing between this chamber and the ingress end of the tube will be sufficient to cause a siphoning action, lifting the condensates through the educator passage 64 or tube 66 and discharging the same into the flowing stream of gas, by which they are removed.

Due to the low line pressure at the ingress end of tube 30 and the relatively high line pressure at the discharge end thereof, the gas will be forced to flow from the conduit at the latter end of the tube through the space or spaces between the wall of said tube and the wall of pipe 48 toward the ingress end of the tube. Hence a higher absolute pressure will exist in the chamber or space 62 as compared with the absolute pressure of the flowing gas in the ingress end of the tube 30. Advantage is taken of this pressure difference to discharge the condensates through the eductor passage or tube from the chamber 62, into the flowing stream of gas.

In Figure 11 of the drawings, an alternative means for mounting or supporting the pressure recovery tube is shown. In this case, a plurality of rigid metal struts or arms 68 are welded at one of their ends to the external surface of the wall of tube 30, in predetermined spaced relation from the ingress end thereof. Each of these struts has a front edge portion 70 adapted to be lined up with the end edge of the pipe section 48 as a gauge, and the other ends of said struts then welded to the inner surface of the pipe wall. Thus when the end of the pipe is secured to the valve body by the weld 52, the ingress end edge of the tube 30 will have substantial abutting contact with the end face of the valve body. No positive connection between the tube 30 and the valve body is required, since a fluid tight joint at this point is not essential. Therefore this assembly and mounting of the pressure recovery tube within the conduit pipe section 48 is independent of the valve body. The wall of the tube 30 may either be provided with the pressure balancing openings 46, or the egress end thereof may be spaced from the wall of the pipe in the manner shown in Figure 9.

In this instance, I have shown the radially projecting eduction tube 66' carried by the recovery tube 30, without the curved lower end but having its lower open end disposed at an angle of substantially 45 degrees and facing in the down-stream direction.

As a modification, the supporting arms or struts 68 may each be of tubular form with one of the tubular arms opening into the tube 30 and having its other open end welded to the wall of pipe 48 to serve as an eductor tube as well as a support for the recovery tube 30.

Figure 13 of the drawings illustrates another slight modification, where the wall of the pressure recovery tube 30 at its ingress end is depressed or indented at the top thereof as shown at 72 to provide a connecting passage between the outlet section 28 of the venturi throat and the chamber 62 between the pressure recovery tube and the wall of pipe 48. In this case, the other egress end of the tube 30 is welded to the wall of the pipe 48, in the manner shown in Figure 1 of the drawings. The passage formed by this indentation 72 of the tube wall function as a velocity head Pitot tube to admit gas to the chamber 62 which will be at a higher static pressure than that in the ingress end of the tube, due to the conversion of the velocity pressure energy to static pressure, thus creating the pressure differential to cause the discharge of the condensates through the eductor tube into the flowing gas stream in the manner above explained.

With little or no condensate present in the lower section of the pipe 48, a circulation of gas is created by the differential pressure produced by the main gas stream flowing through the tube 30 at the ingress end thereof. Vapors which might ordinarily condense on the wall of the pipe are therefore carried away by the gas circulating between the tube 30 and pipe 48 through chamber 62 and discharged by the eductor tube into the main stream of flowing gas.

From the above description, it will be seen that the present invention provides a novel venturi valve of simple and rugged construction for easy and quick installation in large capacity pipe lines or conduits and which will operate with maximum pressure recovery efficiency. It will of course be apparent that my improved venturi valve assembly, with obvious modifications in form and dimensions, may also be used in connection with pipe lines or conduits of various other sizes.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are intended to be embraced therein.

What is claimed and desired to be secured by United States Letters Patent is:

1. In combination with a large diameter fluid conduit having a plurality of pipe line sections, a venturi valve assembly including a valve body installed between and rigidly connected to adjacent pipe sections, said body having a venturi-form fluid inlet passage and an opposed outlet passage, a valve member mounted in said body between said passages for movement to open and closed position, a longitudinally tapered pressure recovery tube extending coaxially within the pipe section at the downstream side of the valve for a portion of the length of said pipe section, means supporting said tube at its smaller end in alignment with said outlet passage, means mounting the tube at its larger end on the wall of said pipe section, said pressure recovery tube varying from generally rectangular form at its smaller end to cylindrical form at its larger end, and means for balancing internal and external fluid pressures on the tube wall, said valve body having an eductor passage connecting a zone of high static pressure between the tube and pipe walls with a zone of relatively low static pressure at the fluid ingress end of the tube to receive condensates collecting in the pipe line and discharge the same into the fluid stream.

2. In combination with a fluid conduit having a venturi throat section, a longitudinally tapering pressure recovery tube, means for mounting said tube within the conduit at the down-stream side of the venturi throat, said tube having means admitting velocity pressure from the fluid stream to the chamber between said tube and conduit wall for conversion to high static pressure, and eductor means connecting said chamber with a zone of low static pressure at the ingress end of said tube to receive and discharge condensates collecting in said chamber into the fluid stream.

3. The combination defined in claim 2, in which the eductor means comprises a tube projecting radially from the wall of said pressure recovery tube into said chamber.

4. The combination defined in claim 2, wherein said means for mounting the pressure recovery tube includes a plurality of rigid supporting struts extending radially between the tube and conduit walls.

5. A venturi valve comprising a valve casing having a venturi-form fluid inlet passage and an opposed outlet passage, a valve member mounted in said body between said passages for movement between open and closed positions, a pipe line section connected to the downstream side of said valve casing, a longitudinally tapered pressure recovery tube positioned in said pipe line at the downstream side of the valve, means supporting said tube at its smaller end in aligned fluid transmitting connection with said outlet passage and with the larger end of said tube in radially fixed relation to the pipe line section wall resulting in the formation of an annular space between the outside of said tube and the internal periphery of said wall, means effective during fluid flow through said valve for producing within said space a fluid pressure higher than the line fluid pressure at the ingress end of said tube, and means for removing condensate from within said space and dissipating it into the line comprising an eductor passage connecting the fluid transmitting line adjacent said ingress end of the tube with said spaced adjacent the outer periphery of said space.

6. A venturi valve as defined in claim 5 wherein said eductor means comprises a passage formed in the valve body.

7. A venturi valve comprising a unitary valve casing having a venturi-form fluid inlet passage and an opposed outlet passage, a valve member mounted in said body between said passages for movement to open and closed positions, an external longitudinally tapered pressure recovery tube positioned in a pipe line at the downstream side of the valve, means supporting said tube at its smaller end in aligned relation with said outlet passage, and with the larger end of said tube in radially fixed relation to the pipe line wall, and means for balancing internal and external fluid velocity pressures on the tube wall comprising a discontinuous annular opening between the larger end of said tube and the adjacent internal surface of said pipe line wall.

8. In a fluid line wherein a valve body in the line constitutes a pressure decreasing restriction to fluid flow and comprises an outlet passage terminating downstream in an opening of generally rectangular cross-section, a downstream conduit secured to said valve body, said conduit having a cylindrical cross-section at a region downstream from said valve body, a pressure recovery tube of longitudinally changing cross-sectional area and shape mounted within said conduit so as to provide a substantial continuation of said outlet passage, the smaller end of said tube being substantially of the same shape and size as said downstream outlet passage opening, and the larger end of said tube being substantially circular in cross-section and being substantially of the same size as said substantially cylindrical downstream region of said conduit, means converting velocity head of fluid in said line to a static head in the space between said conduit and said tube, and a condensate removal passage connecting said space with a region of lower pressure in said line.

9. In a fluid line wherein a valve body in the line constitutes a pressure decreasing restriction to fluid flow and comprises an outlet passage terminating downstream in an opening of generally rectangular cross-section, a downstream conduit secured to said valve body, said conduit having a cylindrical cross-section at a region downstream from said valve body, a pressure recovery tube of longitudinally changing cross-sectional area and shape mounted within said conduit so as to provide a substantial continuation of said outlet passage, the smaller end of said tube being substantially of the same shape and size as said downstream outlet passage opening, and the larger end of said tube being substantially circular in cross-section and being substantially of the same size as said substantially cylindrical downstream region of said conduit, means effective in response to fluid flow through said substantially cylindrical downstream region of said its surrounding conduit a fluid pressure which is greater than the line fluid pressure adjacent the ingress end of said tube comprising a direct passage from said downstream outlet passage into said space, and a condensate removal passage connecting said space with said line adjacent said ingress end of said tube.

References Cited in the file of this patent

UNITED STATES PATENTS

| | | |
|---|---|---|
| 509,400 | Ruble | Nov. 28, 1893 |
| 541,781 | Wheeler | June 25, 1895 |
| 807,251 | Davidson | Dec. 12, 1905 |
| 842,393 | De Ferranti | Jan. 29, 1907 |
| 1,522,490 | Borden | Jan. 13, 1925 |
| 2,056,807 | Shanley | Oct. 6, 1936 |
| 2,136,532 | West | Nov. 15, 1938 |
| 2,414,751 | Ludeman | Jan. 21, 1947 |
| 2,598,968 | Boosey | June 3, 1952 |

UNITED STATES PATENT OFFICE

CERTIFICATE OF CORRECTION

Patent No. 2,799,467                                   July 16, 1957

Edwin E. Hedene

It is hereby certified that error appears in the printed specification of the above numbered patent requiring correction and that the said Letters Patent should read as corrected below.

Column 3, line 6, for "verturi" read -- venturi --; column 4, line 12, for "educator" read -- eductor --; line 69, for "function" read -- functions; column 6, line 16, for "spaced" read -- space --; line 70, for "substantially cylindrical downstream region of said" read -- line producing in the space between said tube and --.

Signed and sealed this 24th day of September 1957.

(SEAL)

Attest:

KARL H. AXLINE
Attesting Officer

ROBERT C. WATSON
Commissioner of Patents